US008739533B2

(12) United States Patent
Yogev et al.

(10) Patent No.: US 8,739,533 B2
(45) Date of Patent: Jun. 3, 2014

(54) SOLAR AUGMENTED WIND TURBINE FOR STABLE AND DISPATCHABLE UTILITY SCALE POWER GENERATION

(76) Inventors: Or Yogev, Sherman Oaks, CA (US); Yitzhak Yogev, Kiryat Tivon (IL)

( * ) Notice: Subject to any disclaimer, the term of this patent is extended or adjusted under 35 U.S.C. 154(b) by 311 days.

(21) Appl. No.: 13/307,010

(22) Filed: Nov. 30, 2011

(65) Prior Publication Data

US 2012/0137684 A1 Jun. 7, 2012

Related U.S. Application Data (60) Provisional application No. 61/458,790, filed on Dec. 2, 2010.

(51) Int. Cl.
*F03G 6/00* (2006.01)
*F03G 7/00* (2006.01)
*F01K 1/00* (2006.01)
*F01K 3/00* (2006.01)
*F03D 9/00* (2006.01)
*H02P 9/04* (2006.01)

(52) U.S. Cl.
USPC ......... 60/641.12; 60/641.15; 60/659; 290/44; 290/55

(58) Field of Classification Search
USPC ................. 60/641.8–641.15, 659; 290/44, 55
See application file for complete search history.

(56) References Cited

U.S. PATENT DOCUMENTS

| 3,832,853 | A | 9/1974 | Butler, Jr. | |
|---|---|---|---|---|
| 4,224,528 | A | 9/1980 | Argo | |
| 4,229,941 | A | 10/1980 | Hope | |
| 4,447,738 | A | 5/1984 | Allison | |
| 4,455,834 | A * | 6/1984 | Earle | 60/659 |
| 1,453,084 | A | 6/1987 | Akhudov | |
| 5,103,646 | A | 4/1992 | Fini | |
| 5,206,537 | A | 4/1993 | Alejandro | |
| 5,436,508 | A | 7/1995 | Sorensen | |
| 6,492,743 | B1 | 12/2002 | Appa | |
| 6,927,503 | B2 | 8/2005 | Enis | |
| 7,067,937 | B2 * | 6/2006 | Enish et al. | 290/55 |
| 7,615,884 | B2 | 11/2009 | McMaster | |
| 7,851,935 | B2 | 12/2010 | Tsao | |
| 7,964,981 | B2 | 6/2011 | Tsao | |
| 8,247,915 | B2 * | 8/2012 | Crane et al. | 290/44 |
| 2005/0109030 | A1 | 5/2005 | Manolis | |
| 2006/0055175 | A1 | 3/2006 | Grinblat | |

(Continued)

FOREIGN PATENT DOCUMENTS

FR      2829805 A1  *  3/2003
WO    2008029190          3/2008

*Primary Examiner* — Christopher Jetton
(74) *Attorney, Agent, or Firm* — Browdy and Neimark, PLLC (57) ABSTRACT

The present invention describes a novel integration between wind and solar thermal renewable energy technologies. An existing wind turbine consisting of a hub and blades is operated by the power generated from a waterless solar thermal system (using high pressure, high temperature air) during periods of low wind availability. The solar thermal system consist of a heliostat field, solar air receiver panels, a thermal energy storage tank and a Pelton wheel assembly system for converting thermal energy of air into kinetic energy of the power shaft of the wind turbine. The thermal energy converting system consists of a plurality of supersonic air nozzles acting as stator, producing supersonic air jets to interact with a rotating Pelton wheel. A thermal storage system provides means for energy dispatchability. The proposed integrated system is capable of generating a stable renewable energy with minimum intermittency.

18 Claims, 9 Drawing Sheets

(56) References Cited

U.S. PATENT DOCUMENTS

| | | |
|---|---|---|
| 2008/0050234 A1 | 2/2008 | Ingersoll |
| 2009/0033102 A1 | 2/2009 | Enis |
| 2010/0117372 A1 | 5/2010 | McMaster |
| 2011/0041501 A1 | 2/2011 | Gerard |
| 2011/0115226 A1* | 5/2011 | Logan et al. .......... 290/52 |

* cited by examiner

SOLAR AUGMENTED WIND TURBINE FOR STABLE AND DISPATCHABLE UTILITY SCALE POWER GENERATION

RELATED APPLICATIONS

Cross-Reference to Related Application

This application claims the benefit of provisional patent application Ser. No. 61/458,790 filed 2010 Dec. 2 by the present inventor

TECHNICAL FIELD

The present invention relates to wind and solar thermal renewable energy technologies and presents a methodology to integrate the two energy sources along with energy storage in order to improve the stability and dispatch ability of renewable power generation. The integration is specially aimed at achieving a lower cost of renewable power generation to make it more competitive against conventional fossil power generation.

BACKGROUND

Wind turbines provide an attractive means to produce renewable electricity at low costs. One of the key issues with power output from a wind turbine is its inherent intermittent nature, which often dictates that wind farms be augmented with supplemental generation capacity using natural gas firedturbines to enhance stability and dispatch ability of power supply.

Many inventors have sought a renewable energy solution that would provide a low cost stable and dispatchable power, without the use of fossil fuel. An extensive survey of patent literature has disclosed patents with this theme and these are summarized next.

U.S. Pat. No. 20100117372 (McMaster) discloses a "Hybrid Wind Turbine" where the shaft powerproduced by a wind turbine is integrated with shaft power produced from a thermal energy source like solar or fossil firing. The thermodynamic cycle employed for the thermal power source is a Rankine cycle utilizing a working fluid that changes phase. This system does not provide any means for renewable energy storage and dispatchability is maintained principally through fossil firing.

U.S. Pat. No. 2008029190 A1 (Sui) discloses a "Combined Wind Power Electricity Generator", which is a hybrid wind turbine additionally powered by a gas jet during periods of insufficient windresource. The gas is stored in a gas bottle and is heated using solar heat. The exact mechanism for converting the gas or air jet into shaft power is not clearly detailed. Also there is no clear discussion of energy storage. The size as well as the practicality of the use of gas stored in bottles for utility scale applications is not addressed satisfactorily.

U.S. Pat. No. 4,229,941 (Hope) discloses a "Method and System for Generating Energy from Solarand Wind Resources". The patent describes a solar thermal energy system utilizing a parabolic mirror and a Fresnel tube to produce steam. The steam is used to produce shaft power, which is integrated with the shaft power produced by wind. The system described in this patent is more suited to residential applications and its scalability to utility scale is questionable. Also this system does not address the question of energy storage.

U.S. Pat. No. 4,229,941 (Enis) discloses a method in which power generated from a single or multiple windmills is stored as compressed air in a single or multiple pressurized storage tanks. During times when wind is not available, the compressed air is converted into power via a turbo exchanger. Heat is added to compressed air utilizing several sources of energy such as: solar thermal, waste heat collector and a separate heating unit. This system provides means for renewable energy storage and dispatchability through compressed air storage system, which requires high volume storage tanks at high-pressure.

U.S. Pat. No. 7,851,935 (Tsao) discloses a method in which a parabolic dish/trough solar collector is interconnected to a thermo-mechanical engine. The thermo-mechanical engine is mechanically integrated to the transmission element of the wind turbine through a secondary shaft. The system was designed as a small-scale roof top system. The storage element in their system is purposed to store direct electricity.

U.S. Pat. No. 7,615,884 (McMaster) discloses an enhancement to an existing wind turbine. The enhancement is done using an auxiliary power section, which is connected to the generator to enable longer time periods in which the wind turbine generator can be utilized. The generator itself has two inputs, one from the primary power generation, i,e, the wind turbine rotor and a secondary one from the auxiliary section, where each one of the inputs can drive the generator independently. The described system has three modes of operation: wind only, auxiliary only and combined. The auxiliary powersection can be one of many of heat engines such as: combustion engine, gasoline engine, diesel engine, natural gas etc. The heat recovery (recuperation) system uses the exhaust heat from the heat engine as well as the solar collector system to heat a liquid medium. The liquid medium can either be water, which will be used directly through a steam turbine (as one form of an auxiliary motor options) or as a liquid source to an organic Rankine turbine (as another form of an auxiliary motor), where it will be recycled back to the solar absorber. No storage of any type has been included in this system.

SUMMARY

The present invention may be embodied as a conventional horizontal or vertical axis wind turbine with an associated electric power generator and blades connected via a hub and shaft. The wind turbine shaft power is augmented by shaft power being generated from hot pressurized air driving a Pelton wheel such that rotation of the wheel will cause a rotation of the wind turbine hub and blades. The Pelton wheel provides additional power to the wind turbine which allows it to operate under low wind conditions or no wind at all. In eases where wind is not present, the wind turbine blades will be pitched to minimize drag force generated by the rotation of the blades.

The Pelton wheel is driven by a plurality of supersonic air jets, produced by expansion of high pressure and high temperature air through supersonic expansion nozzles. The high temperature air is created by pumping compressed air from an electric air compressor through a solar air receiver that is heated by solar radiation directed from a field of heliostats. The solar air receiver is supported on the wind turbine tower. The air Pelton wheel feeds mechanical power into the wind turbine shaft. Hence the wind turbine tower, electrical generator, transformers and other type of power integration units are leveraged as both the wind as well as solar power generating equipment, saving capital cost. The exhaust air jet is at ambient pressure after Pelton wheel energy transfer, and is discharged into the atmosphere. The present invention may also be embodied as having an integral thermal energy storage system. The solar air receiver is divided into two independent segments whereby one segment is used to produce pressurized hot air to drive the Pelton wheel and the other segment is used to simultaneously charge a ceramic or rock bed based thermal energy storage system. During the hours when both solar as well as wind resource are insufficient to generate the rated output of the wind turbine generator, cold pressurized air is introduced into the thermal storage system to discharge it and produce high temperature and high pressure air that can be used to run the Pelton wheel.

In another embodiment, the hot air Pelton thermodynamic cycle is closed instead of being discharged into the atmosphere after Pelton wheel energy transfer. In this configuration the Pelton wheel is enclosed in a pressure vessel and the air jet is expanded to under ambient pressure and temperature instead of being discharged at ambient pressure. After Pelton wheel energy transfer, air is collected in a header and pumped back to the compressor, hence creating a closed cycle. This closed cycle embodiment will increase the thermodynamic efficiency of the thermal power cycle. The closed cycle embodiment also gives the freedom to use other working fluids besides air (helium or CO2), which can enhance the thermodynamic efficiency of the cycle.

DRAWINGS

Reference Numerals

| Numeral | Part |
|---|---|
| 1 | Heliostat |
| 2 | Fan |
| 3 | Storage Tank |
| 4 | Compressor |
| 5 | Air Receiver One |
| 6 | Air Receiver Two |
| 7 | Hot Air Pipe |
| 8 | Cold Air Pipe |
| 9 | Wheel |
| 10 | Wheel Shroud |
| 11 | Wheel Shaft |
| 12 | Buckets |
| 14 | Supersonic Air Jets |
| 15 | Gear Reducer System |
| 16 | Small Spur Gear |
| 17 | Large Spur Gear |
| 18 | Shat Extension |
| 19 | Brake |
| 20 | Wind Turbine Gear Box Transmission |
| 21 | Main Shaft |
| 22 | Nacelle Cover |
| 23 | Radial Turbine Rotor |
| 24 | Turbine Housing |
| 25 | Wind Turbine Tower |
| 26 | Four Way Solenoid Valve |
| 27 | Generator |
| 28 | Hub |
| 29 | Rotor Blade |
| 30 | Radial Turbine Housing |
| 31 | Bevel Gear System |
| 32 | Receiver Header |
| 33 | Tubes |
| 34 | Receiver Enclosure Box |
| 35 | Pressurized Tank |
| 36 | Pebbles/Bricks/Honey Combs |
| 37 | Insulation |
| 38 | Collected Exhausted Air Pipe |
| 39 | Brake System front-end shaft |
| 40 | Hot Air Inlet |
| 41 | Cold Air Outlet |
| 42 | Cold Air Inlet From Compressor |
| 43 | Wheel Manifold |
| 44 | Nacelle Platform |

-continued

| Numeral | Part |
|---|---|
| 45 | Pillow Bearing |
| 46 | Top Spur Gear Shaft |
| 47 | Exhaust Wheel Port |
| 48 | Vacuum Pump |
| 49 | Rotor Vanes |
| 50 | Housing Inlet Port |
| 51 | Bevel Gear Train Shaft |

DRAWINGS FIGURES

The system includes several different embodiments where each embodiment contains a basic configuration of solar thermal system and a storage unit, integrated on an existing wind turbine. The embodiments are distinct from each other in the following manner.

1. The first embodiment includes a Pelton wheel connected to the back end shaft of the wind turbine generator via gear reducer. The exhaust air from the wheel is discharged into the atmosphere.

2. The second embodiment includes a Pelton wheel connected to the back end shaft of the wind turbine generator via gear reducer. The exhaust air from the wheel is cycled back into the compressor through a header. This constitutes a closed thermodynamic system. Helium or CO2 can replace air as a working fluid in this embodiment to achieve higher thermal efficiency.

3. The third embodiment includes an enclosed radial turbine rotor instead of a Pelton wheel connected to the back end shaft of the wind turbine generator via gear reducer. The exhaust air from the wheel is discharged into the atmosphere 4. The fourth embodiment includes an enclosed radial turbine rotor connected to the back end shaft of the wind turbine generator via gear reducer. The exhaust air from the wheel is cycled back into the compressor through a header 5. The fifth embodiment includes a Pelton wheel connected in front of the wind turbine braking system through bevel gear system. The exhaust air from the wheel is discharged into the atmosphere 6. The sixth embodiment includes a Pelton wheel connected in front of the wind turbine braking system through bevel gear system. The exhaust air from the wheel is cycled back into the compressor through a header 7. The seventh embodiment includes an enclosed radial turbine rotor connected in front of the wind turbine braking system through bevel gear system. The exhaust air from the wheel is discharged into the atmosphere 8 The eighth embodiment includes an enclosed radial turbine rotor connected connect in front of the wind turbine braking system through bevel gear system. The exhaust air from the wheel is cycled back into the compressor through a header

Though the present invention is not restricted to a particular wind turbine power output, the authors feel that the invention will be better illustrated if a typical wind turbine power rating is used throughout the text. The following examples will provide a description for all the different embodiments. The first embodiment will be described in much more detail to illustrate the system's various modes of operation and to describe all its individual components. Since all the subsequent embodiments are derived from the first embodiment, only the distinct elements from each embodiment relative to the first embodiment will be thoroughly described for the additional sections.

DETAILED DESCRIPTION OF FIRST EMBODIMENT

Figure 1:
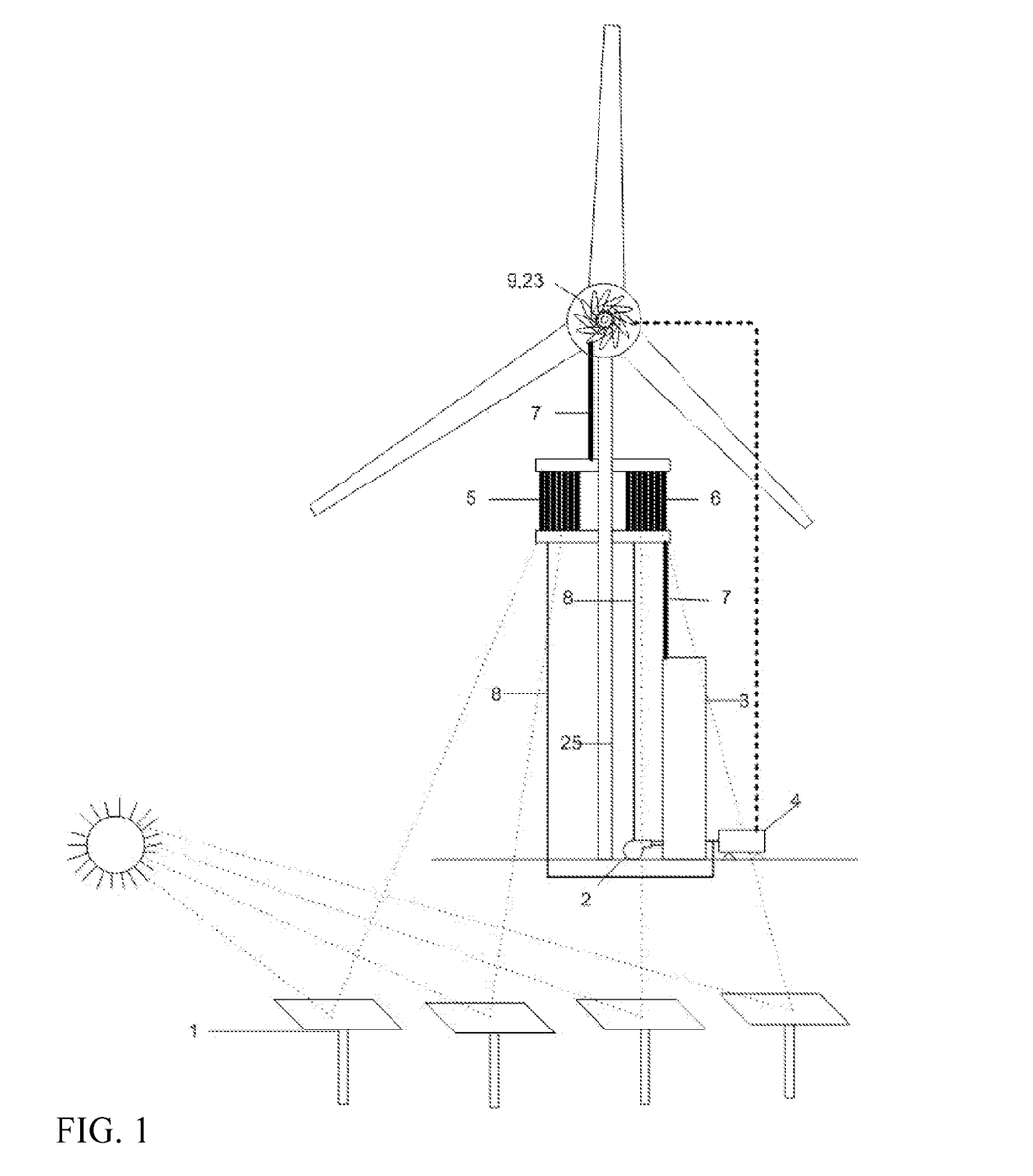
FIG. 1 depicts a general front view of the system for all different embodiments.
Figure 2:
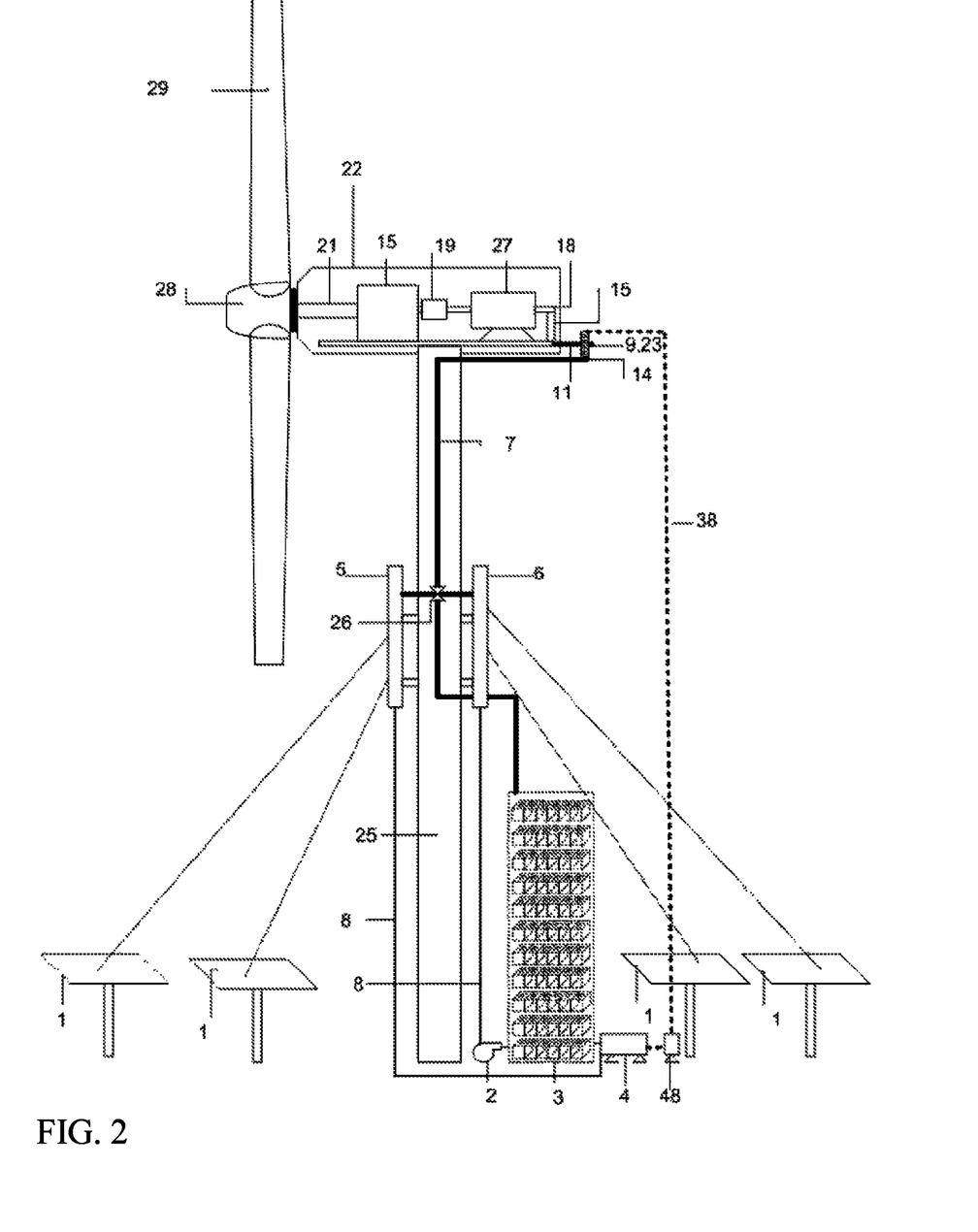
FIG. 2 depicts a general side view of the system for all different embodiments.
Figure 3:
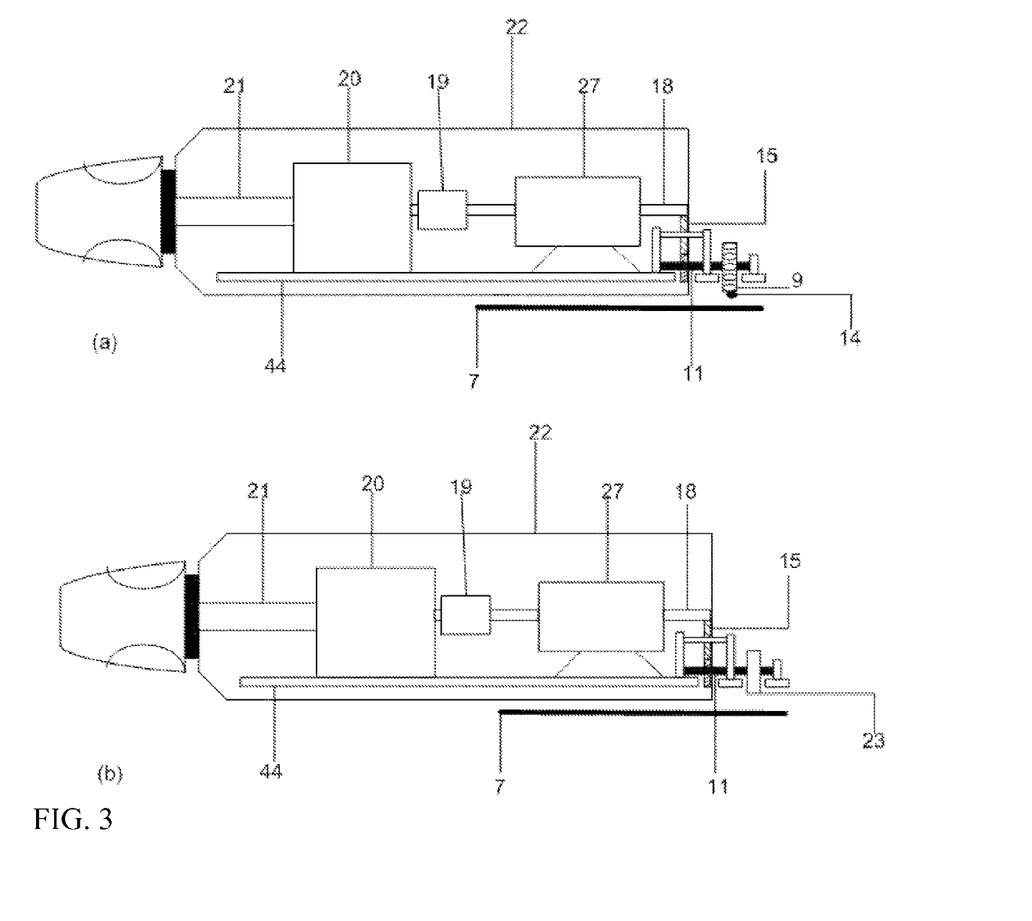
FIG. 3 depicts a detailed view of all the integrated components between the wind turbine system and solar system for embodiments one through four.

The first embodiment refers to FIG. 1 FIG. 2 and FIG. 3a.

Figure 8:
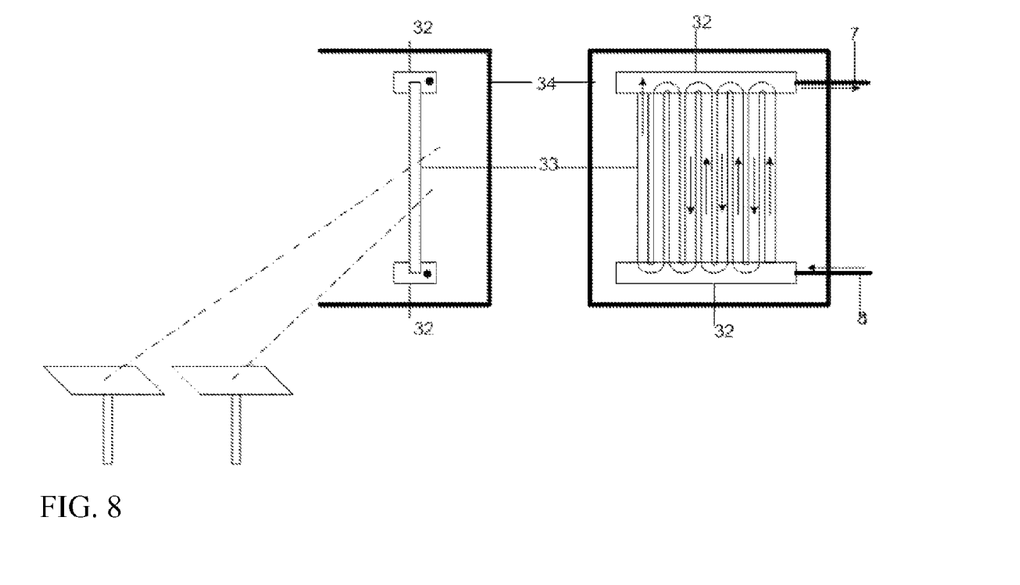
FIG. 8 depicts a detailed view of the air receiver system, which is used in all embodiments
Figure 9:
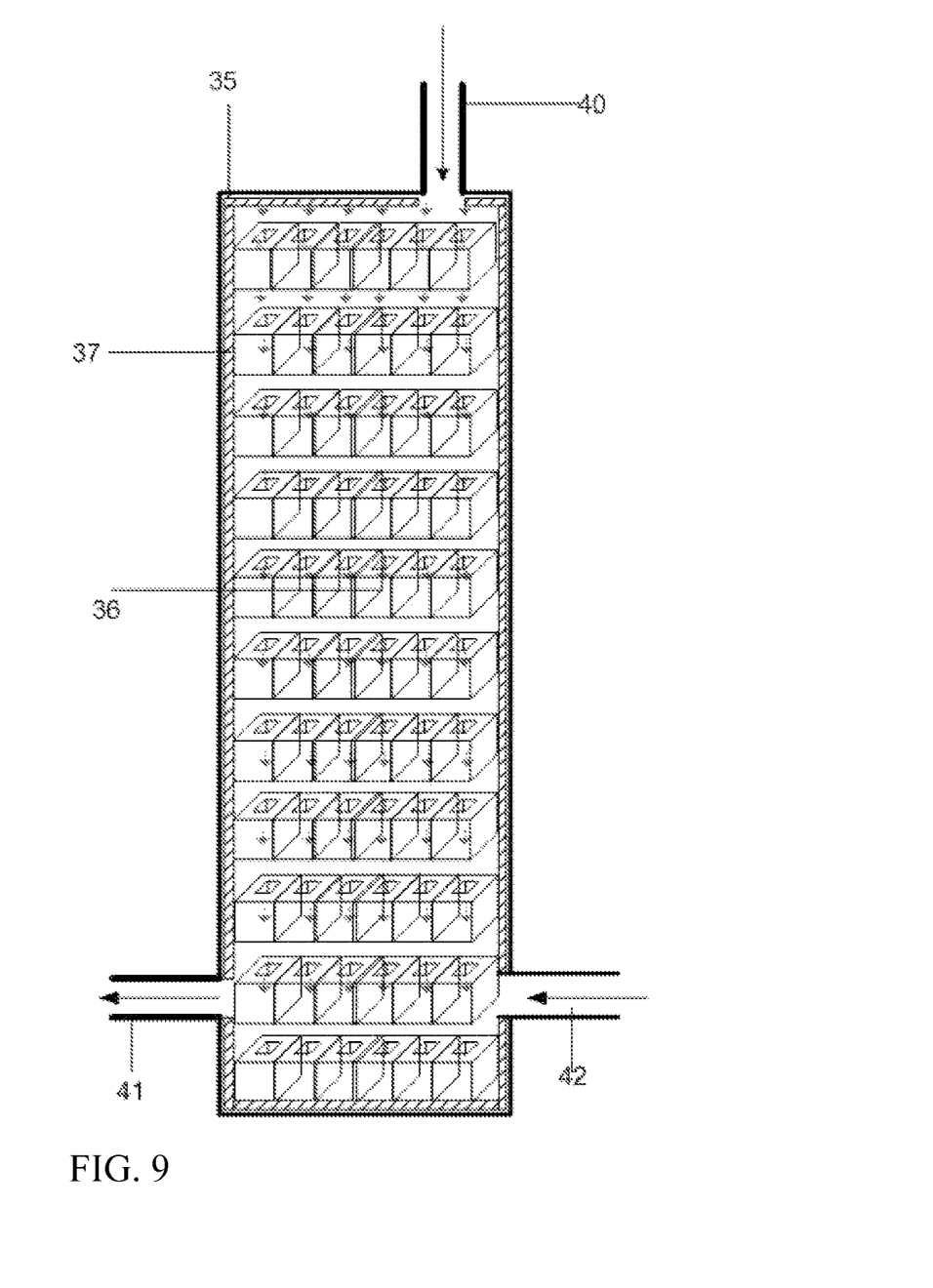
FIG. 9 depicts a detailed view of the thermal storage system, which is used in all embodiments

The wind turbine consists of a tower 25, rotor blades 29 which are connected to a hub 28, the power transmission shaft 21, a brake system 19 and the electrical generator 27. Around the wind turbine a field of heliostats 1 is constructed. Each heliostat 1 consists of a tracking device and a reflector module, which aims to reflect and concentrate sunlight onto metallic solar air-receiver panels 5,6 erected on the wind turbine tower. The solar receiver panels consist of several opaque metallic tubes arranged as shown in FIG. 8. Each receiver panel contains two horizontal headers 32, an inlet header in which cold compressed air from the compressor is taken in and an outlet header in which the hot compressed air is collected and discharged. The opaque vertical tubes 33 are connected between the two headers and support two mode of air flow paths; a. straight flow of air between the two header, b. serpentine flow between several adjacent vertical tubes before the air is introduce back to the top header. The air receiver panel 5 is connected to a thermal storage tank 3 while the air receiver panel 6 supplies hot air for instant conversion to electric energy. The air compressor 4 is a standard compressor, which can produce compressed air at up to 15 bar of pressure and is typically powered by electricity, which presents a parasitic loss of the plant. The air compressor is located on the ground next to the wind turbine tower. The air compressor is connected to receiver panels to support one type of operational mode. The air compressor is also connected to the storage tank 3 to deliver high pressurize air during the charging and discharging modes of the storage tank. The thermal storage unit, which is shown in FIG. 9 comprises of a pressurized tank 35, a layer of insulation 37 which adheres to the inner surface of the tank and a heat storage medium 36 which can be in the form of pebbles, bricks, ceramic honey combs or other type of material with high heat capacity. The insulation layer reduce heat loss from the heat storage medium into ambient. The thermal storage unit has three ports, hot air inlet 40 and cold air outlet 41 which are connected to the hot air pipe 7 and to the fan 2 respectively and in addition, a cold air inlet port 42, which is connected to the compressor. The fan in this example is a high pressure, high temperature fan, which can produce sufficient head to overcome the pressure losses in the receiver and storage unit at high air flow rates.

Such fan units are very common in the iron and steel industries and are used to provide hot air to blast furnaces.

Figure 6:
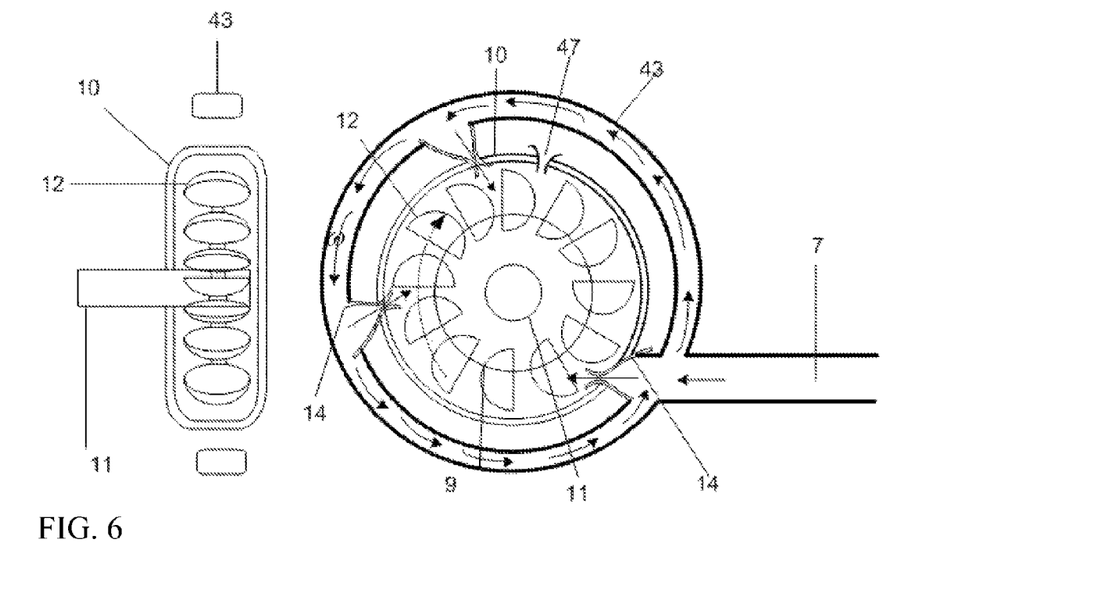
FIG. 6 depicts a detailed view of the Pelton wheel system, which is used in embodiments one, two, five and six
Figure 10:
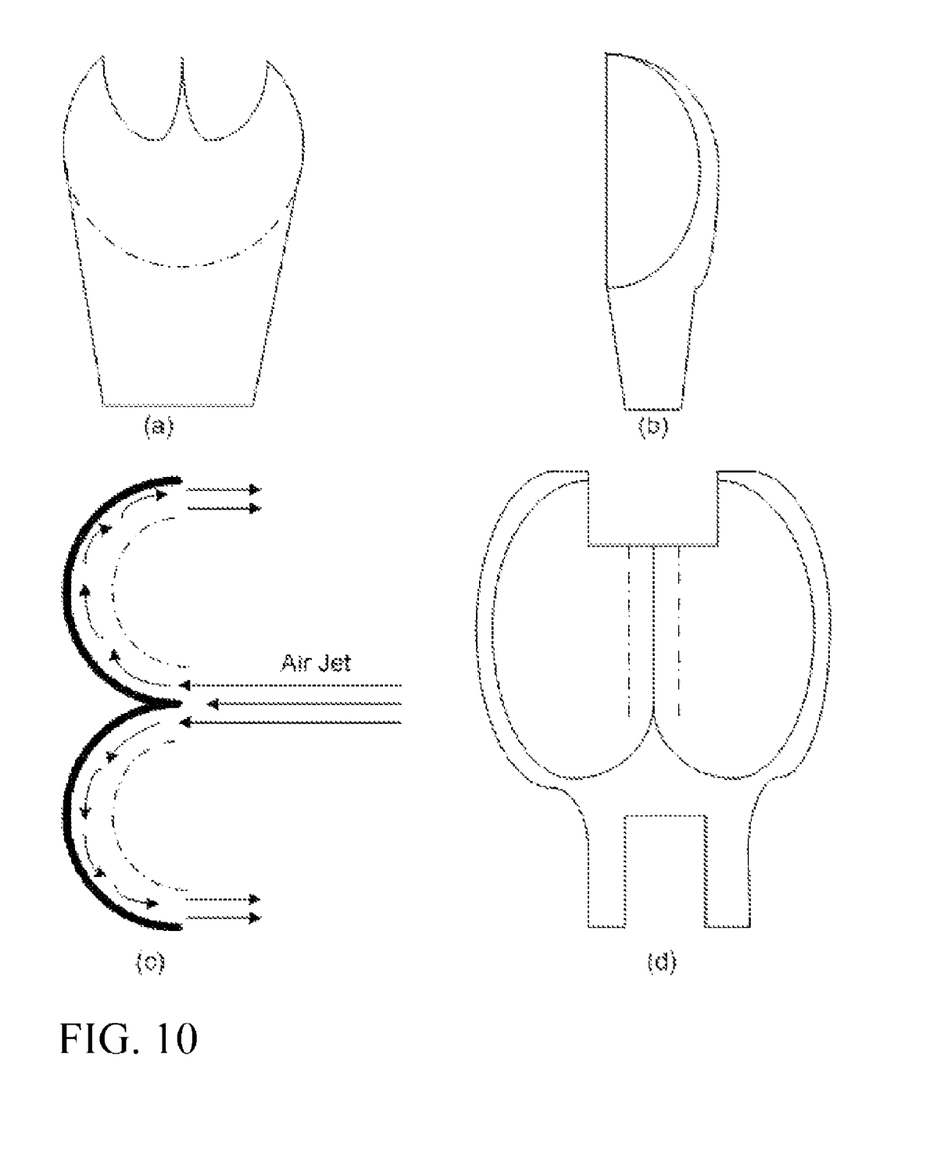
FIG. 10 depicts a detailed view of an individual bucket as well the airflow path across the bucket's surfaces, the buckets are an integrated part of the PELTON wheel assembly.

The fan unit is connected to dedicated air receiver panels in order to provide a close loop air circulation at high pressure between the receiver, fan and the storage unit. The thermal storage has a temperature gradient that sets from the hot air inlet to the cold air outlet. In this example air is entering the unit at 800 C temperature and existing at 300 C. The air receiver panels are connected to the hot air pipe line 7 through a four way solenoid valve 26 which enables three modes of air flow paths; a. from the storage tank through to the hot air pipe line, bypassing receiver 6; b. from receiver panel one to the hot air pipe line. c. combined flow from both storage tank through receiver panel two and receiver panel one to the hot air pipeline. The hot air pipeline is connected to a plurality of supersonic air nozzles 14 through the wheel's manifold device 43, as show in FIG. 6. The wheel is located outside the wind turbine nacelle cover 22 as shown in FIG. 3. The wheel manifold follows the circumference contour of the wheel itself and distributing the hot air across the individual nozzles. During the wheel operation mode, each nozzle is facing a single bucket 12 at a time. The hot air expands through every nozzle and impinges on each bucket. Each bucket contains two convex surfaces in a symmetrical position with respect to the bucket central line, as shown in FIG. 10c,d. These surfaces are aimed to create an airflow path, which will guide the airflow in an opposite direction relative to its impinging direction. The air jets impart an impinging force onto the wheel.

Figure 5:
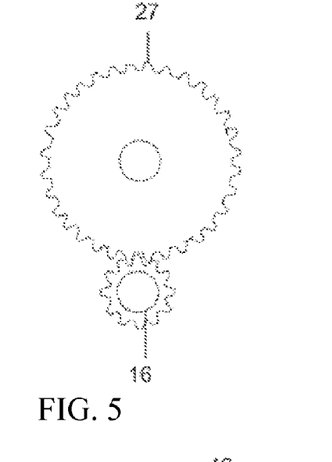
FIG. 5 depicts a detailed schematic view of the gear reducer system, which is used in embodiments one through four.
Figure 11:
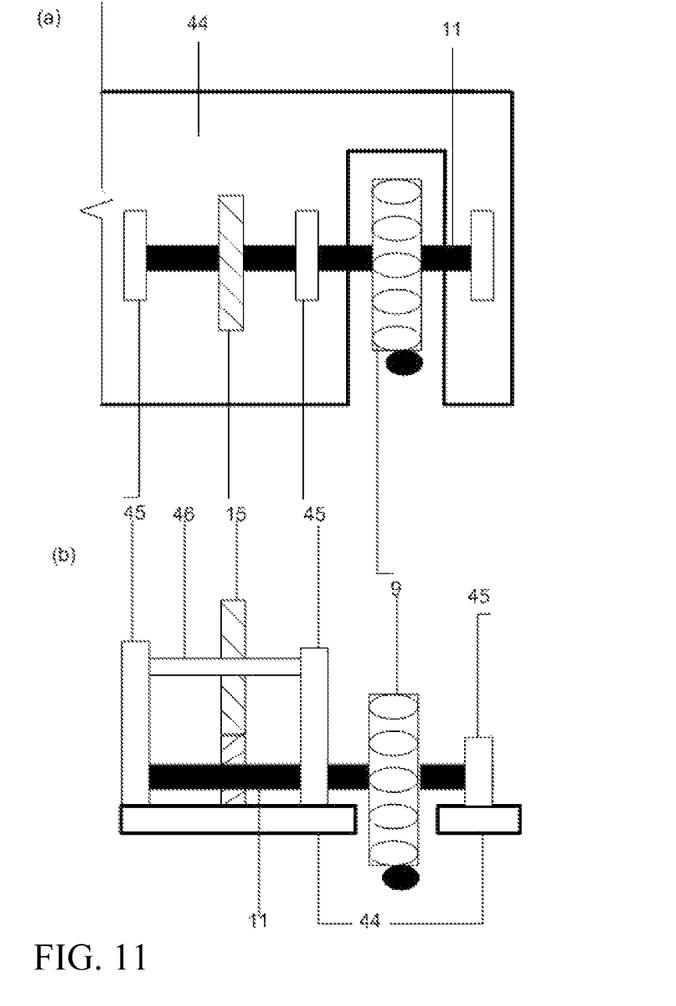
FIG. 11 depicts a detailed view of the wheel-gear reducer integration system. This figure shows the bearings system arrangement between the two components as well their location with respect to thenacelle platform In its most general embodiment, the system comprises of a horizontal axis wind turbine with a rated power output of 1 MW or higher. These wind turbines are commonly used in utility scale wind farms.

This force generates a large torque at the wheel central point where the wheel shaft 11 is located. By using a plurality of nozzles in opposite locations with respect to the wheel center point, all the lateral forces from all nozzles will be canceled out and thus a pure moment will be generated with respect to the wheel central point. There are two main factors which are critical to maximize the efficiency of energy transfer from the air jets to the wheel; a. the nozzle should be oriented such that the impingement force is always tangential to the wheel outer contour b. the wheel tangential speed at the bucket center point should be half the supersonic speed of the air that leaves the nozzle. The latter requirement in this example is achieved by connecting the wheel shaft to the shaft extension 18 at the back end of the generator through a gear reducer system 15. The gear reducer system in this example simply consist of two spur gears, as shown in FIG. 5 which provide the proper gear ratio between the shaft extension RPM and the wheel RPM. However, this invention is not limited for a particular gear reducer system and can potentially consist of different type of gear reducer configurations. The gear reducer system and the Pelton wheel shaft are supported by a set of several pillow block bearings, as shown in FIG. 11a and FIG. 11b. FIG. 11a and FIG. 11b show a side view and top view of the bearings arrangement between the wheel and the gear reducer respectively. These figures also depict the integration between any of these components with respect to the nacelle platform. In this configuration, the nacelle platform is extended out of the nacelle's shroud and the Pelton wheel is placed on a slot that is located on the extended part of the platform, as shown in FIG. 11a. There are two sets of bearings that are located at an equal distance from each side of the Pelton wheel. One set of bearing supports the wheel shaft. The other set of bearing is located on an equal distance from each side of the gear reducer system. This set of bearings supports the spur gear's shaft.

Operation of First Embodiment

During the start of operation air at atmospheric conditions is compressed by the air compressor 4 up to a pressure of 15 bar. This is first used to fill the inventory in the closed air loop connecting the storage system air receiver panels 6 with the storage unit 3. Once the compressor has supplied the inventory to the storage loop, the compressed air stream from the compressor is diverted to receiver panels 5 for direct operation, where compressed air is heated from the compressor exit temperature of around 300 C to a maximum temperature of 800 C. The airflow path in receiver 5 can be once through or have serpentine flow through the various absorber tubes. The hot air from receiver 5 is sent by means of an insulated high temperature alloy pipe 7 to the Pelton wheel 9. At the location of the wheel the airflow is split into a plurality of supersonic air nozzles 14 (FIG. 6), where the 800 C and 15 bar air is expanded to supersonic speeds to an exit pressure of 1 bar. The high velocity jets produced by the air nozzle system 14 impinge upon the buckets 12 of the Pelton wheel thereby transferring kinetic energy to the wheel. For maximum energy transfer, it is required that the tangential velocity of the buckets is close to one half the supersonic speed of the oncoming air jet. This is accomplished by means of a gear train 16, 27 as shown in FIG. 5, which converts the high RPM of the Pelton wheel to the desired RPM of the shaft providing mechanical power to the electric generator. After interaction with the buckets in the Pelton wheel, the air having transferred significant portion of their kinetic energy to the wheel, is at temperature of around 200 C and pressure of 1 bar is discharged into the atmosphere. This latter discharging process contributing to the overall thermal losses since the air still carry some amount of thermal energy before its been discharged into the atmosphere. While the Pelton wheel produces mechanical energy, the blades of the wind turbine are also capturing wind energy and producing mechanical energy. There is a control system that modulates the airflow to the Pelton wheel in response to the energy short fall coming from wind power. In this way the solar thermal resource is augmenting the wind resource in order to produce stable electric output from the generator.

The high pressure air loop connecting the air receiver panels 6 to the storage unit 3 has two operating modes namely charging and discharging. During the charging mode, the loop is closed with the air inventory initially supplied by the air compressor. The high temperature fan 2 in the loop moves pressurized air into the solar receiver panel 6 where it is heated from an inlet temperature of 300 C to around 800 C. This hot air is then piped to the storage unit 3 through an insulated alloy steel pipe 7.

The storage unit 3 is composed of a ceramic honeycomb structure comprising of many thousands of small air channels formed into a ceramic matrix or it can be just a pebble bed made of rock or ceramic with a large thermal capacity. As the air flows through the channels in the ceramic matrix or the pebble bed, it transfers its thermal energy to the solid material in the storage unit. A temperature thermocline is setup inside the storage unit with the solid material being hot (close to 800 C) at the top of the unit in the vicinity of the inlet port 40 (FIG. 9) and cold (close to 300 C) at the exit port 41 (FIG. 9). The air experiences pressure drop in the storage unit, which is compensated by the air fan 2. The charging cycle is run simultaneously as the direct operation cycle described above where part of the receiver panels are dedicated exclusively for energy storage (receiver panels 6)

During the discharge mode of the storage unit, the air fan 2 is turned off and solar receiver panels 6 are isolated from the storage unit 3 by means of control valves. Air is compressed by the air compressor to 15 bar and is injected into the bottom of the storage unit 3 through port 42 (FIG. 9) at a temperature close to 300 C. As the air moves in reverse from the bottom to the top of the unit it gets progressively heated up by removing thermal energy from the solid material in the storage unit 3. The air exits from the storage unit at port 40 (FIG. 9) at a temperature close to 800 C. From here it is taken to the Pelton wheel by means of the insulated hot air pipe 7 and the same energy transfer process takes place at the Pelton wheel as is been described in the direct operation mode.

Description of Second Embodiment

The second embodiment is derived from the first embodiment and thus includes almost all the components which have been described in the "Detailed Description of First Embodiment" paragraph. The difference between the first and second embodiment is that the latter include a connection between the exhaust wheel outlet 47 and a vacuum pump 48 and from the vacuum pump to the compressor inlet port. The vacuum pump has been added to the system to ensure that the enclosed wheel can operate under sub atmospheric conditions. This enables the air jets to expand to sub atmospheric pressures in the nozzle and hence allows for a higher thermodynamic efficiency of the cycle. The principal benefit of a closed loop cycle is the ability to achieve higher thermal efficiency through means of sub atmospheric pressure expansion of the gas jets in the nozzle. The closed system also enables the use of a working fluid different than air (Helium or CO2) to achieve higher thermodynamic efficiency Operation of the Second Embodiment The second embodiment is derived from the first embodiment and thus includes almost all the operational modes which have been described in the "Operation of First Embodiment" paragraph. The difference between the two embodiments from an operational perspective is that the second embodiment is a closed loop system. In the second embodiment the air from the exhaust port of the wheel 47 is returned to the compressor. In this configuration the hot compressed air in the nozzles is expand to a pressure that is below ambient conditions, meaning vacuum conditions. This mechanism enables to lower the temperature of the exit air to be as low as ambient temperature. In these conditions the thermal energy loss of the discharged air from the exhaust wheel port to the atmosphere, as been depicted in the first embodiment is completely eliminated. However there will be challenges in maintaining sub atmospheric pressure conditions at the wheel enclosure. A vacuum pump will be needed to maintain sub atmospheric conditions which will contribute to a parasitic loss.

Description of Third Embodiment

Figure 7:
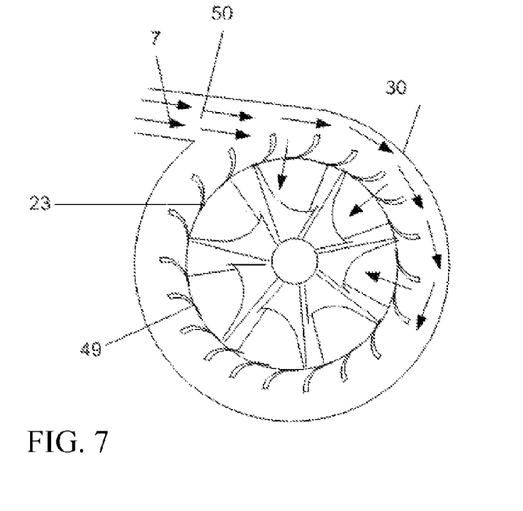
FIG. 7 depicts a detailed view of the radial turbine rotor system, which is used in embodiments three, four, seven and eight

The third embodiment is derived from the first embodiment and thus includes all the components that have been described in the "Detailed Description of First Embodiment" paragraph. In the third embodiment the Pelton wheel is replaced with a standard radial turbine rotor 23 as shown in FIG. 3 and FIG. 7. The radial turbine rotor has the same functionality as the Pelton wheel of rotating the wind turbine blades when the rotor is operated. The radial turbine rotor consist of housing 30 and the rotor itself 23, as shown in FIG. 7. The housing is connected to the hot air pipeline where hot compressed air is introduced into the housing inlet port. The rotor contains outer and inner vanes that are responsible for expanding the compressed air inwardly while converting its thermal energy into kinetic energy. All the mounting locations and the bearings arrangements remain the same as the first embodiment.

Operation of the Third Embodiment

The third embodiment is derived from the first embodiment and thus includes almost all the operational modes that have been described in the "Operation of First Embodiment" paragraph. The difference between the two embodiments from an operational perspective is that the third embodiment includes a radial turbine rotor that replaces the Pelton wheel. The radial turbine rotor has the same functionality as the Pelton wheel of providing means of rotating the wind turbine blades when the rotor is operated. The process in which the thermal energy in the air is converted into kinetic energy of wheel consists of two stages. In the first stage, the hot air is introduced into the housing inlet port 50 when it is first guided to the outer vanes of the rotor 49. In the first stage, the outer vanes guide the air towards the inner vanes.

During that process the air is partially expanded thus converting some of its thermal energy into kinetic energy that is delivered toward operating the rotor. When the air is guided through the inner vanes it is completely expanded into ambient pressure and then discharged into the atmosphere. In this final stage not all the thermal energy which is stored in air is converted into kinetic energy and thus the remaining thermal energy is wasted.

Description of Fourth Embodiment

The fourth embodiment is derived from the first embodiment and presents a combination of both the second and the third embodiments. Here a closed loop system is presented which contains radial turbine rotor as a replacement for the Pelton Wheel. All the other components are identical with respect to the first embodiment.

Operation of the Fourth Embodiment

The fourth embodiment is derived from the first embodiment and thus includes all the operational modes that have been described in the "Operation of First Embodiment" paragraph. The fourth embodiment also presents a combination of both the second and the third embodiments where a closed loop system is presented and contains a radial turbine rotor as a replacement for the Pelton Wheel.

Description of the Fifth Embodiment

Figure 4:
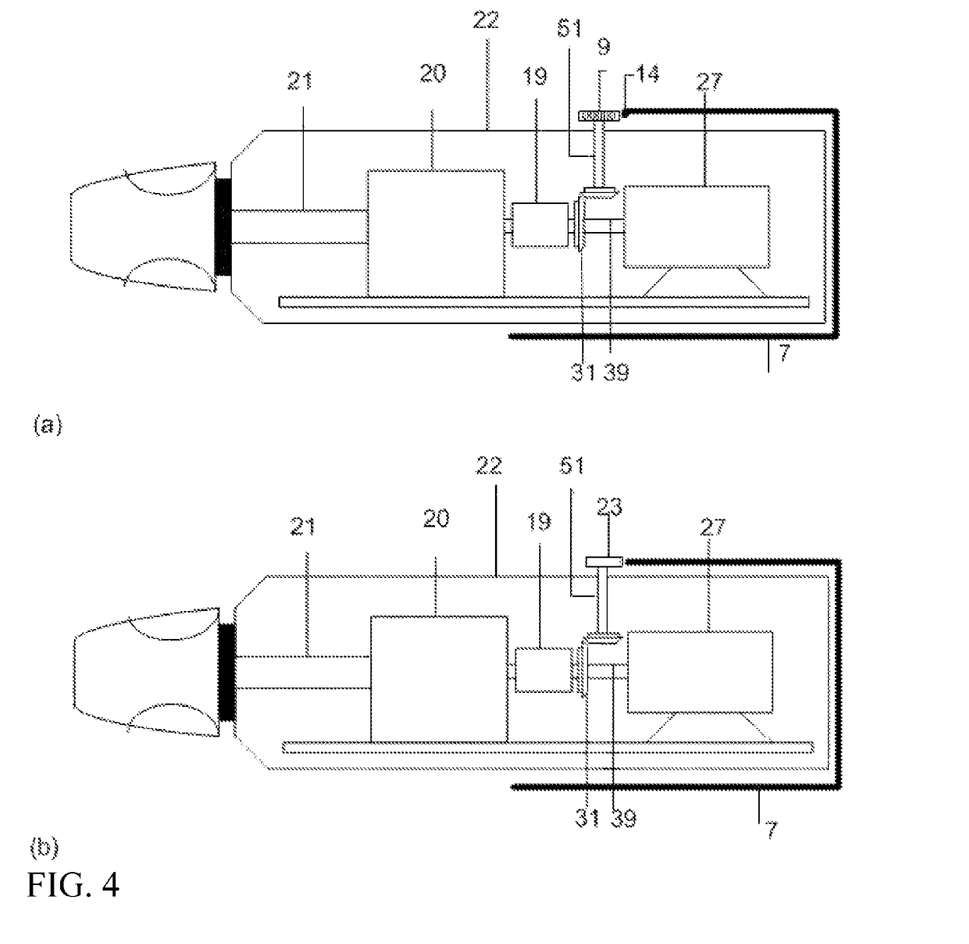
FIG. 4 depicts a detailed view of all the integrated components between the wind turbine system and solar system for embodiments five through eight.

The fifth embodiment is derived from the first embodiment and thus includes almost all the components that have been described in the "Detailed Description of First Embodiment" paragraph. In the fifth embodiment the Pelton wheel is integrated to the wind turbine system through the brake system front end shaft 39. The integration is done by means of a gear train system that consists of two bevel gears, as shown in FIG. 4a. The bevel gears are perpendicular to each other and thus transfer the rotational motion of the shaft 39 from a horizontal direction to a vertical direction. The ratio between the two gear's diameters sets the rotational speed of the wheel with respect to the shaft 39 such that the former will be as close to the optimal working conditions. The wheel is connected to the Bevel's gear train shaft 51 that extends out of the nacelle cover 22.

Operation of the Fifth Embodiment

The operational description of the fifth embodiment is identical to the operational description of the first embodiment.

Description of the Sixth Embodiment

The sixth embodiment is derived from the first embodiment and thus includes almost all the components that have been described in the "Detailed Description of First Embodiment" paragraph. In the sixth embodiment, the Pelton wheel is integrated to the wind turbine system through the brake system front end shaft 39 as been described in the "Detailed Description of the Fifth Embodiment" paragraph. The difference between the fifth and the sixth embodiment is that the latter includes a connection between the exhaust wheel outlet 47 and a vacuum pump 48 and from the vacuum pump to the compressor inlet port. A detailed description regarding the latter distinction is described in the "Detailed Description of Second Embodiment" paragraph.

Operation of the Sixth Embodiment

The operational description of the sixth embodiment is identical to the operational description of the second embodiment as been described in "Operation of the Second Embodiment" paragraph.

Detailed Description of the Seventh Embodiment

The seventh embodiment is derived from the first embodiment and thus includes almost all the components that have been described in the "Detailed Description of First Embodiment" paragraph. In the seventh embodiment the Pelton wheel is replaced with a standard radial turbine rotor 23 as shown in FIG. 4b. In the seventh embodiment the Pelton wheel is integrated to the wind turbine system through the brake system front end shaft 39 as been described in the "Detailed Description of the Fifth Embodiment" paragraph. The radial turbine rotor has the same functionality as the Pelton wheel: of rotating the wind turbine blades when the rotor is operated.

Operation of the Seventh Embodiment

The operational description of the seventh embodiment is identical to the operational description of the second embodiment as been described in "Operation of the third Embodiment" paragraph.

Detailed Description of the Eighth Embodiment

The eighth embodiment is derived from the first embodiment and thus includes almost all the components that have been described in the "Detailed Description of First Embodiment" paragraph. In the eighth embodiment the Pelton wheel is replaced with a standard radial turbine rotor 23 as shown in FIG. 4b. In the eighth embodiment the Pelton wheel is integrated to the wind turbine system through the brake system front end shaft 39 as been described in the "Detailed Description of the Fifth Embodiment" paragraph. The difference between the seventh and the eight embodiments is that the latter includes a connection between the exhaust wheel outlet 47 and a vacuum pump 48 and from the vacuum pump to the compressor inlet port. A detailed description regarding the latter distinction is described in the "Detailed Description of Second Embodiment" paragraph.

Operation of the Eighth Embodiment

The operational description of the eighth embodiment is identical to the operational description of the second embodiment as been described in "Operation of the fourth Embodiment" paragraph.

CONCLUSION, RAMIFICATION AND SCOPE

Accordingly the reader will see that, according to at least one embodiment the proposed system demonstrates a unique wind-solar hybrid configuration which provides a reliable source of power generation that uses both wind and solar as a renewable energy resources. In addition, the storage unit which has been described to be an integral part of the system allow for power dispatchability during the day. Finally, the proposed wind-solar hybrid configuration which utilizes both solar thermal hardware in conjunction with existing wind turbine hardware was designed in a way which significantly reduces the overall capital cost and levelized cost of energy of the integrated system. While the above description contains much specification, these should not be constructed as limitation of the scope of any embodiment, but as exemplifications of the presently preferred embodiment thereof.

What is claimed is:

1. A system for electric power generation from solar and wind energy sources, comprising:
    a wind turbine including:
        a tower (25) having a tower top and a tower base mounted on a surface,
        a nacelle cover (22) mounted on the tower top and comprising an electrical generator (27) and a main shaft (21) configured to drive the electrical generator (27),
        a hub (28) arranged at one end of the nacelle cover and mechanically coupled to the electrical generator through the main shaft (21), and
        a plurality of rotor blades (29) attached to the hub (28) for rotating thereof, thereby driving the electrical generator (27);
    a driving wheel (9) mechanically coupled to the electrical generator and to the hub (28);
    a wheel manifold (43 or 30) surrounding the driving wheel (9, or 23);
    at least one solar air-receiver panel (5 or 6) mounted on the tower (25) and comprising at least one header (32) and serpentine flow tubes (33) connected to the header (32), said at least one header (32) and said serpentine flow tubes (33) containing a gas capable to flow therethrough in operation of the system;
    a hot air pipe (7) being in a gas communication with said at least one solar air-receiver panel at one end, and to the wheel manifold (43) at another end;
    a plurality of heliostats (1) arranged in the vicinity of the tower (25) configure for receiving solar light and reflecting the solar light to said at least one solar air-receiver panel;
    a thermal storage tank (3) having a tank top and a tank base, and including a hot air inlet (40) arranged at the tank top and coupled to the hot air pipe (7), a cold air-inlet (42) arranged at the tank base and a cold-air outlet (41) arranged at the tank base, said thermal storage tank (3) configured for storing thermal energy transferred from at least one solar air-receiver panel by the gas receiving the thermal energy when passing through the serpentine flow tubes (33) and through said at least one header (32) and carrying said thermal energy to said thermal storage tank (3) when passing to the hot air inlet (40);
    a four-way valve (26) coupled to the hot air inlet (40) and to the hot air pipe (7), and configured (i) to provide a gas flow from the thermal storage tank (3) to the wheel manifold (43), (ii) to provide a gas flow from said at least one solar air-receiver panel (5 or 6) to the wheel manifold (43), and (iii) to provide a gas flow from said at least one solar air-receiver panel (5 or 6) to the thermal storage tank (3);
    an air compressor (4) in one mode of operation being coupled to the cold air-inlet (42) of thermal storage tank (3) for providing the compressed gas thereto for heating the gas, and forcing the heated gas from the thermal storage tank (3) to the wheel manifold (43) coupled to the thermal storage tank (3) through the four-way valve (26) connected the hot air pipe (7), and in another mode of operation being couple to said at least one air solar panel (5 or 6) for heating the gas, and forcing the heated gas from said at least one solar air-receiver panel (5 or 6) to the wheel manifold (43) through the four-way valve (26) connected the hot air pipe (7); and
    a fan (2) coupled to the cold-air outlet (41) of the thermal storage tank (3) and to said at least one solar air-receiver panel (5 or 6), and configured for providing a gas flow circulation therebetween.

2. The system of claim 1, wherein the wheel manifold (43) surrounds the driving wheel (9) and has a plurality of air nozzles (14) mounted in openings along an inner circumference of the wheel manifold (43) and facing the wheel (9).

3. The system of claim 2, wherein the air nozzles (14) are oriented such that an impinging force provided by the compressed gas is tangential to the wheel.

4. The system of claim 2, wherein the driving wheel (9) is configured as a Pelton wheel.

5. The system of claim 4, wherein the Pelton wheel includes a plurality of buckets (12).

6. The system of claim 5, wherein a tangential velocity of the buckets in operation of the system is half of a velocity of the gas ejected from the air nozzles (14).

7. The system of claim 2, wherein the inner circumference of the wheel manifold (43) includes an exhaust wheel port (47) configure for release of the gas from the wheel.

8. The system of claim 7, further comprising a vacuum pump (48) in gas communication with the compressor (4) and the exhaust wheel port (47) of wheel manifold, and configured for providing vacuum condition at the exhaust wheel port (47).

9. The system of claim 2, wherein the air nozzles (14) of the wheel manifold (43) are supersonic air nozzles.

10. The system of claim 1 wherein the driving wheel (9) is mechanically coupled to the electrical generator through a front-end shaft (39) and to the hub (28) through the main shaft (21).

11. The system of claim 1 wherein the driving wheel (9) is mechanically coupled to the electrical generator through a shaft extension (18) and to the hub (28) through the main shaft (21).

12. The system of claim 1, wherein the wheel manifold is configured as a housing (30) surrounding the driving wheel (23) and has a plurality of vanes (49) arranged on an inner circumference of the housing (30) and separated by openings in the inner circumference and providing an expansion of the gas through the vanes (49) and the openings inwardly toward the wheel (23) for rotating thereof.

13. The system of claim 1, further comprising a gear reducer system (15) arranged between the driving wheel (9 or 23) and the electrical generator (27) for matching the rotating speed therebetween.

14. The system of claim 13, wherein the gear reducer system (15) is mounted at the rear side of the electrical generator (27) through a shaft extension (18).

15. The system of claim 1, further comprising a brake system (19) arranged inside the nacelle cover (22) and a brake system front-end shaft (39) coupling the brake system (19) to the electrical generator (27) through a bevel gear reducer system (31) which in turn also coupled to the driving wheel (9 or 23).

16. The system of claim 1, wherein said thermal storage tank (3) includes a ceramic honey-comb structure including gas channels formed into a ceramic matrix.

17. The system of claim 1, wherein said thermal storage tank (3) includes pebbles.

18. The system of claim 1, wherein the gas used in the system is selected from air, Helium, $CO_2$.

* * * * *